3,514,376
CONTROL OF SCALING IN EVAPORATORS
Murrell L. Salutsky, Highland Park, Ill., assignor to W. R. Grace & Co., New York, N.Y., a corporation of Connecticut
No Drawing. Continuation-in-part of application Ser. No. 632,558, Apr. 21, 1967. This application June 20, 1969, Ser. No. 835,317
Int. Cl. B01d 3/00; C02b 5/00
U.S. Cl. 203—7          5 Claims

ABSTRACT OF THE DISCLOSURE

Treating saline water evaporators with acrylic acid polymers having a weight average molecular weight of up to 13,000 prevents scaling of heat exchange surfaces.

---

This application is a continuation-in-part of earlier filed copending application Ser. No. 632,558 filed Apr. 21, 1967 and now abandoned in favor of this application.

This invention relates to a process for preventing the formation of adherent deposits and scales on the heating surfaces of saline water evaporators. In particular, this invention relates to a process for treating saline evaporator waters with polyacrylic acid or water-soluble salts thereof.

In summary, the process of this invention is a method for evaporating saline waters such as sea water, brines, and brackish waters comprising maintaining in the saline water a scale inhibiting concentration of a scale inhibiting polymer selected from the group consisting of polyacrylic acid and alkali metal or ammonium salts thereof having weight average molecular weight up to about 13,000 calculated as polyacrylic acid, and evaporating the saline water at a temperature of from 85° Fahrenheit up to 305° Fahrenheit.

Evaporation of sea water and other naturally occurring saline waters gives rise to the formation of scale deposits of low thermal conductivity on the heat transfer surfaces of the distillation plant. The heat transfer coefficients are thereby reduced, leading to deterioration of plant performance and necessitating the eventual shut down of the plant for cleaning. Although several methods are in use for the control of alkaline scales, calcium sulfate and other scaling constituents normally found in saline waters, scaling considerations still set an upper limit on the brine boiling temperature and concentration factor, and hence on plant performance. In evaporators, scale may be formed whenever scale-forming compounds are present in the feed water, but the type and composition of the scale may vary. For example, when evaporation of sea water takes place under reduced pressure at boiling temperatures below 148° Fahrenheit, the principal scaling phase is calcium carbonate; at higher temperatures it is primarily magnesium hydroxide in the form of brucite, but calcium sulfate scales may be formed at all temperatures if the brine concentration is sufficiently high.

At the present time the principal treatment to prevent scale in saline water evaporators employs "Hagevap LP", a mixture of sodium polyphosphates, lignin sulfonic acid derivatives and various esters of polyalkylene glycols, whose functions are sequestering, dispersing, foam inhibiting, and the like. This material, however, is only effective up to 195° Fahrenheit because the polyphosphates rapidly hydrolyze to form a sticky orthophosphate deposit at higher temperatures.

Higher distilling temperatures provide cost reductions, but in order to obtain them, continuous injection of from 100 to 120 parts per million of sulfuric acid to remove bicarbonate and carbonate alkalinity present in natural sea water is currently necessary. This procedure prevents calcium carbonate and magnesium hydroxide scales. However, at temperatures above around 250° Fahrenheit formation of calcium sulfate scales is increased by sulfuric acid treatment.

Also, the logistics and handling of liquid acids are a problem in remote areas, and the potential of accidents to personnel and equipment requires safeguards which again raise the cost of the treatment. Ships will not carry liquid acids under any circumstances, and their evaporators are thus limited to the performance available at 195° Fahrenheit.

A high temperature type treatment has been sought by sea water distillation interests for many years but no adequate treatment had been developed prior to this invention. A variety of materials have been proposed for use as treating agents in the saline evaporator waters. The use of graft polymers having a variety of groups on a starch type base was described in British Pat. 919,450. Trials of polyacrylic acid having a molecular weight greater than 20,000 have been disclosed in U.S. Pat. 3,293,152. This patent shows the prior art understanding that film formation on the heat exchange surfaces is required to prevent scaling, and polyacrylates having a molecular weight of at least 20,000 must be used to prevent scaling, even though the polyacrylate film would lower heat transfer rates.

It is an object of this invention to provide a process for treating saline evaporator waters to prevent scale formation on the heat transfers surfaces thereof without forming a polymeric film. It is a further object of this invention to provide a method for preventing scaling in saline water evaporators by a process which permits higher operating temperatures and makes unnecessary the use of sulfuric acid treatment.

In the process of this invention, a scale inhibiting concentration of the low molecular weight polyacrylate is maintained in the evaporator water. The minimum amount will vary, depending upon the type of evaporator and the brine concentration. Usually from 0.1 to 20 p.p.m. is satisfactory. The preferred range is from 1 to 3 p.p.m. All concentrations are calculated as polyacrylic acid. The term "polyacrylate" is used to denote both polyacrylic acid and the respective salts, particularly sodium, potassium and ammonium salts.

The process of this invention is suitable for treating all saline evaporator systems. Examples of evaporator systems which can be treated by the process of this invention include flash evaporators—including once-through evaporators, and recycle evaporators such as the single effect multistage and multieffect multistage evaporators—and boiling evaporators such as single effect evaporators, multieffect evaporators, falling film evaporators, rising film evaporators, wiped film evaporators, and submerged tube or basket evaporators, all of which are well known in the art. In the process of this invention, the polyacrylates can be added at any place in the system. The polyacrylates can be added to the raw water feed, the non-boiling heating zones where sensible heat is added, the vaporization zones where latent heat is transferred, or recycle streams.

The saline water evaporator systems which can be treated by the process of this invention can use a wide variety of feeds. The process of this invention is suitable for treating evaporator waters such as sea water, brines and brackish waters having a hardness greater than 50 p.p.m., calculated as calcium carbonate, and sewage effluents.

The polyacrylates used in the process of this invention include polyacrylic acid and water soluble salts thereof having a molecular weight from 1,000 to about 13,000 calculated as polyacrylic acid. The optimum results are obtained using polyacrylic acid having a molecular weight of from 5,000 to about 13,000 calculated on the same basis. The preferred polyacrylic acid salts are the alkali metal and ammonium salts. The polyacrylic acid or salts thereof are added to the evaporator system as an aqueous solution, for example containing at least one weight percent of the polymeric agent. The aqueous solution can also contain other treatment agents such as anti-foam agents, corrosion inhibitors, oxygen scavengers, and the like if they are compatible with and do not cause precipitation of the polymer.

With the process of this invention, continuous vaporization at temperatures up to 350° Fahrenheit can be obtained and excellent results at temperatures up to 260° Fahrenheit are observed with minimal deposits.

The process of this inevntion is further illustrated by the following specific but non-limiting examples.

EXAMPLE 1

This example shows the results obtained by treating saline evaporator waters with polyacrylic acid having a molecular weight of above 20,000.

A bench scale, once-through evaporator was operated for 100 hours using a coastal sea water feed having the following analysis.

| | P.p.m. |
|---|---|
| Chlorides | 15,700 |
| $Mg^{++}$ | 1,075 |
| $Ca^{++}$ | 329 |
| $HCO_3^-$ | 110 |
| $CO_3^=$ | 11 |

Total dissolved solids 3.08 weight percent.

The feed was deaerated, treated with sufficient polyacrylic acid to maintain a polyacrylic acid concentration of 2 p.p.m. in the evaporator water, heated to 240° Fahrenheit under pressure, and flashed. The heat transfer coefficients for the heating tube were initially 300 B.t.u./hr. ft.$^2$° Fahrenheit, but after 50 hours of operation, the heat transfer rate declined to 250 B.t.u./hr. ft.$^2$° Fahrenheit and leveled out at this rate. At the end of the test run, the inner wall of the heating tube was examined and found to have a polyacrylate film coating.

EXAMPLE 2

This example shows the superior results obtained by treating saline evaporator waters with a polyacrylate having a molecular weight of less than 13,000.

A 60 ton per day rated capacity two-stage flash evaporator was operated for 15 days during a cruise through the Caribbean and down the west coast of South America. The ocean water used as the feed varied from mid-ocean sea water to more dilute coastal waters containing large amounts of organic pollutants. The feed water, pretreated with 3 p.p.m. of polyacrylic acid having a molecular weight of approximately 8,000, was heated to 190° Fahrenheit, the maximum temperature obtainable with the flash evaporator equipment used, and was then flashed. The rate of distillate vapor production gradually increased and ultimately was 130 percent of the design capacity of the evaporator. Operation at temperatures above 190° Fahrenheit was not possible because the vapor screening system, which removes spray droplets from the distillate vapor, could not handle the large increase in vapor production effected by the higher temperatures. The distillate vapor production remained at 130 percent during the remainder of the test at 190° Fahrenheit.

Examination of the main heater tube outlet ends and the tube sheet showed it to be clean and bright. From this examination, it was concluded the polyacrylic acid not only prevented scale formation in the tubes but also removed therefrom residual scale present on the tubes before the test. In contrast to polyacrylic acid having a molecular weight of greater than 20,000, no evidence of a polyacrylate coating on the heat exchange surfaces was observed.

EXAMPLE 3

The following experiment was performed to compare the scale prevention activity of polyacrylic acid polymers having different weight average molecular weights.

A series of separate samples of Ocean City, Md. sea water (2500 milliliters each) were each mixed with 2100 milliliters of 0.02 Normal sodium bicarbonate and 150 milliliters of 0.02 Normal sodium carbonate in an open container. The resulting solutions had a pH of 8.1 and a hardness of 108 parts per million (calculated as calcium carbonate). 900 milliliter portions of these resultant solutions were then boiled for a period of two hours using stainless steel electric heaters immersed in the boiling water. The heaters were then placed in 200 milliliters of a 0.5 Normal solution of hydrochloric acid to dissolve the scale built up on them during the run. The latter solution of acid-soluble scale was then back titrated with a 1.0 Normal sodium hydroxide solution to determine the milliequivalents of magnesium hydroxide and calcium carbonate.

Four of the 900 milliliter samples were run blank (that is, without any additive). Further like samples were run after the addition of 2 parts per million (based on the 900 milliliters of treated sea water) of several different polyacrylic acids of varying molecular weight. One such further sample included a polyacrylic acid of approximate weight average molecular weight of 8,000. Duplicate samples containing a polyacrylic acid of approximate weight average molecular weight of 10,000 were run; and triplicate samples containing a polyacrylic acid of approximate weight average molecular weight of 20,000.

Different heaters were used in each run to avoid the possibility of scale carryover from one run to another.

The results of the foregoing experimental runs were as follows:

| Example | Approximate weight, average molecular weight of polyacrylic acid additive | Milliequivalents of acid soluble scale | |
|---|---|---|---|
| | | Average | Individual runs |
| 3A | [1] None | 3.8 | 3.5, 3.8, 4.0, 4.0 |
| 3B | 8,000 | 2.3 | 2.3 |
| 3C | 10,000 | 2.5 | 2.2, 2.9 |
| 3D | 20,000 | 5.0 | 4.8, 5.4, 4.7 |

[1] Blank.

Examples 3B and 3C clearly illustrate the very material and unexpected difference in results obtained with acrylic acid polymers having a weight average molecular weight not greater than about 13,000. As seen from Example 3D, use of a polyacrylic acid having a molecular weight of 20,000; as suggested by U.S. Pat. 3,293,152; gave results worse than no treatment at all.

Obviously, many modifications and variations of the invention as hereinabove set forth can be made without departing from the essence and scope thereof, and only such limitations should be applied as are indicated in the claims.

What is claimed is:

1. A process for evaporating saline water comprising treating the said water with a scale inhibiting concentration of a scale inhibiting polymer selected from the group consisting of polyacrylic acid and alkali metal or ammonium salts thereof; said polymer having a weight average molecular weight of from 5,000 to 13,000, calculated as polyacrylic acid; and evaporating said water at a temperature of from 85° Fahrenheit to 350° Fahrenheit.

2. The process of claim 1 wherein the saline water is evaporated at a temperature up to 260° Fahrenheit.

3. The process of claim 1 wherein the saline water is sea water.

4. The process of claim 3 wherein from 0.1 to 20 parts per million of the scale inhibiting polymer, calculated as polyacrylic acid, is maintained in the sea water.

5. The process of claim 4 wherein the polymer has an average molecular weight of from 8,000 to 10,000.

References Cited

UNITED STATES PATENTS

| | | | |
|---|---|---|---|
| 2,783,200 | 2/1957 | Crum et al. | 210—55 X |
| 2,980,610 | 4/1961 | Ruehrwein | 210—58 |
| 3,023,162 | 2/1962 | Fordyce et al. | 210—52 |
| 3,247,106 | 4/1966 | Sopoci | 210—53 X |
| 3,293,152 | 12/1966 | Herbert et al. | 203—7 |

FOREIGN PATENTS

| | | |
|---|---|---|
| 906,531 | 9/1962 | Great Britain. |
| 462,907 | 1/1950 | Canada. |

NORMAN YUDKOFF, Primary Examiner

F. E. DRUMMOND, Assistant Examiner

U.S. Cl. X.R.

203—11; 210—58